June 28, 1966

D. W. PILCHER 3,258,110

ENDLESS CHAIN APPARATUS

Filed Nov. 2, 1964

David W. Pilcher
INVENTOR.

BY Hayden & Pravel

ATTORNEYS

June 28, 1966  D. W. PILCHER  3,258,110
ENDLESS CHAIN APPARATUS

Filed Nov. 2, 1964  3 Sheets-Sheet 3

David W. Pilcher
INVENTOR.

BY Hayden + Pravel

ATTORNEYS

United States Patent Office 3,258,110
Patented June 28, 1966

3,258,110
ENDLESS CHAIN APPARATUS
David W. Pilcher, Houston, Tex., assignor to Bowen Tools, Inc., a corporation of Texas
Filed Nov. 2, 1964, Ser. No. 408,056
10 Claims. (Cl. 198—162)

This invention relates to new and useful improvements in endless chain apparatus, and particularly apparatus for gripping tubing or cable as it moves, or is moved, longitudinally between endless chains.

An object of this invention is to provide a new and improved endless chain apparatus wherein a pair of opposed endless chains are so mounted that the center line between them remains the same regardless of the adjustments in the lateral space therebetween.

An important object of this invention is to provide a new and improved endless chain apparatus wherein a pair of endless chains are disposed with a longitudinal reach therebetween, and wherein such chains are cam-actuated and spring loaded for controlling the lateral distance between the endless chains in the longitudinal reach.

Another object of this invention is to provide a new and improved endless chain apparatus having a pair of endless chains with a longitudinal passage therebetween which is adjustable by means of a control lever for obtaining a gripping and/or feeding of a cable, tubing or other elongate object between the pair of endless chains.

A further object of this invention is to provide a new and improved endless chain apparatus which has a pair of endless chains disposed in opposed relationship to each other, and which are urged apart by an adjustable spring assembly and are forced together by cams in opposition to the spring force, such spring assembly having a single screw adjusting means to simultaneously adjust the force of the spring acting on both cams.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein.

Figure 1:
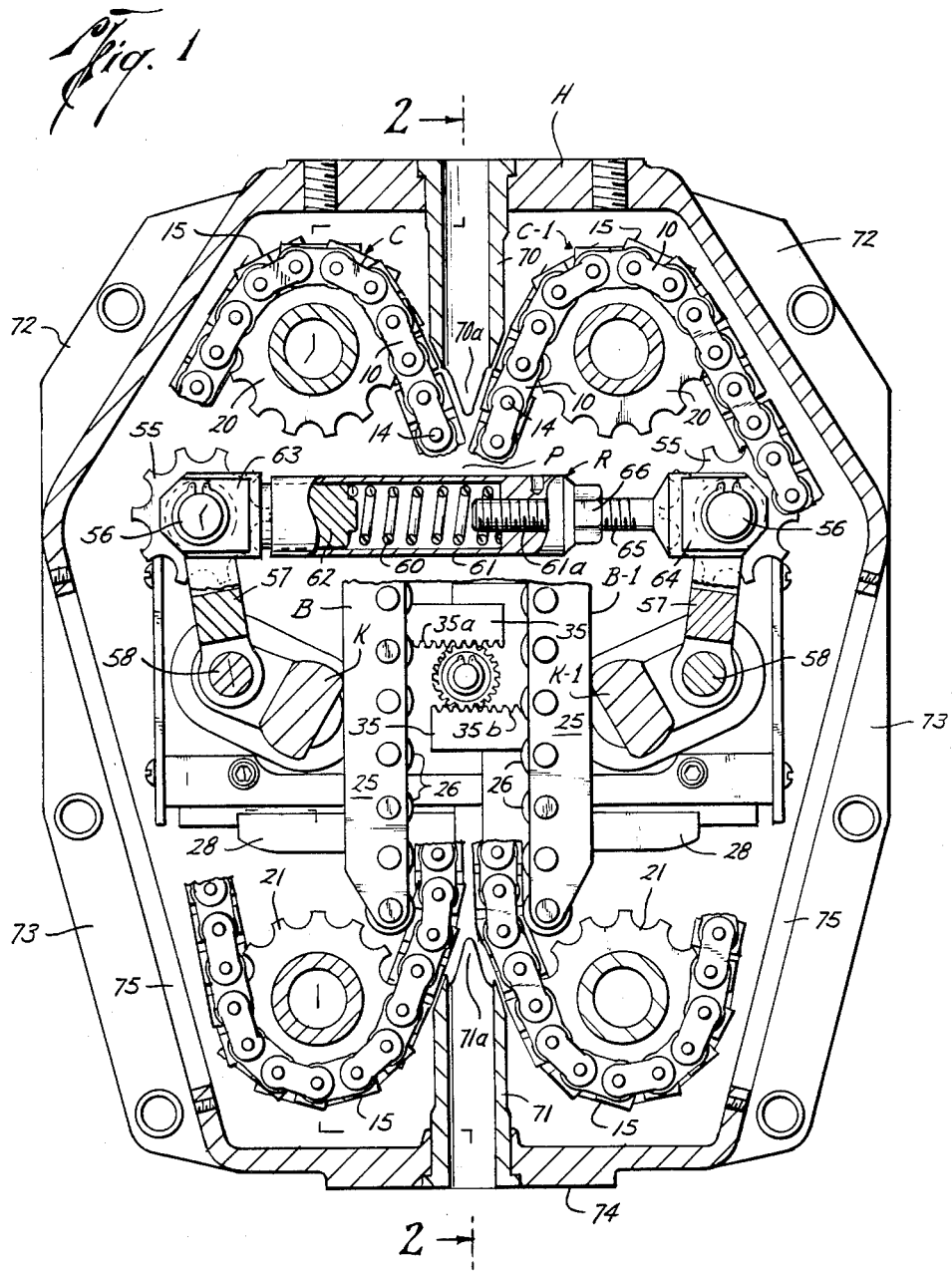
FIG. 1 is a view, partly in elevation and partly in section, illustrating the preferred embodiment of the present invention.

In the drawings, the letter H designates generally the main housing for the apparatus of this invention. Within the housing H, a pair of endless chains C and C-1 are mounted for providing a longitudinal passage P between longitudinal reaches of such endless chains C and C-1 for the gripping and/or feeding of tubing, cable or similar elongate objects, as will be more evident hereinafter. The inner longitudinal reaches of the endless chains C and C-1 which form the longitudinal passage P are engaged at their back surfaces by back-up assemblies B and B-1, respectively. Briefly, such back-up assemblies B and B-1 are urged inwardly by cam members K and K-1, respectively. The inward urging of the cam members K and K-1 is opposed by a resilient means R, which serves to withdraw the cam members K and K-1 to the extent permitted, as will be more evident hereinafter. With the present apparatus, the center line of the passage P may be maintained in a fixed position while moving the longitudinal reaches of the chains C and C-1 to vary the lateral space therebetween. Such control of the space between the reaches forming the longitudinal passage P is preferably provided by a single control lever L (FIGS. 2 and 3) which is adapted to be pivoted or rotated from a locking position to a released position, as will be explained. When the lever L is in the locked position, the cams K and K-1 are in their inward positions shown in FIG. 1 and the chains C and C-1 are in a position for gripping and/or feeding the tubing, cable or other elongate object.

Figure 2:
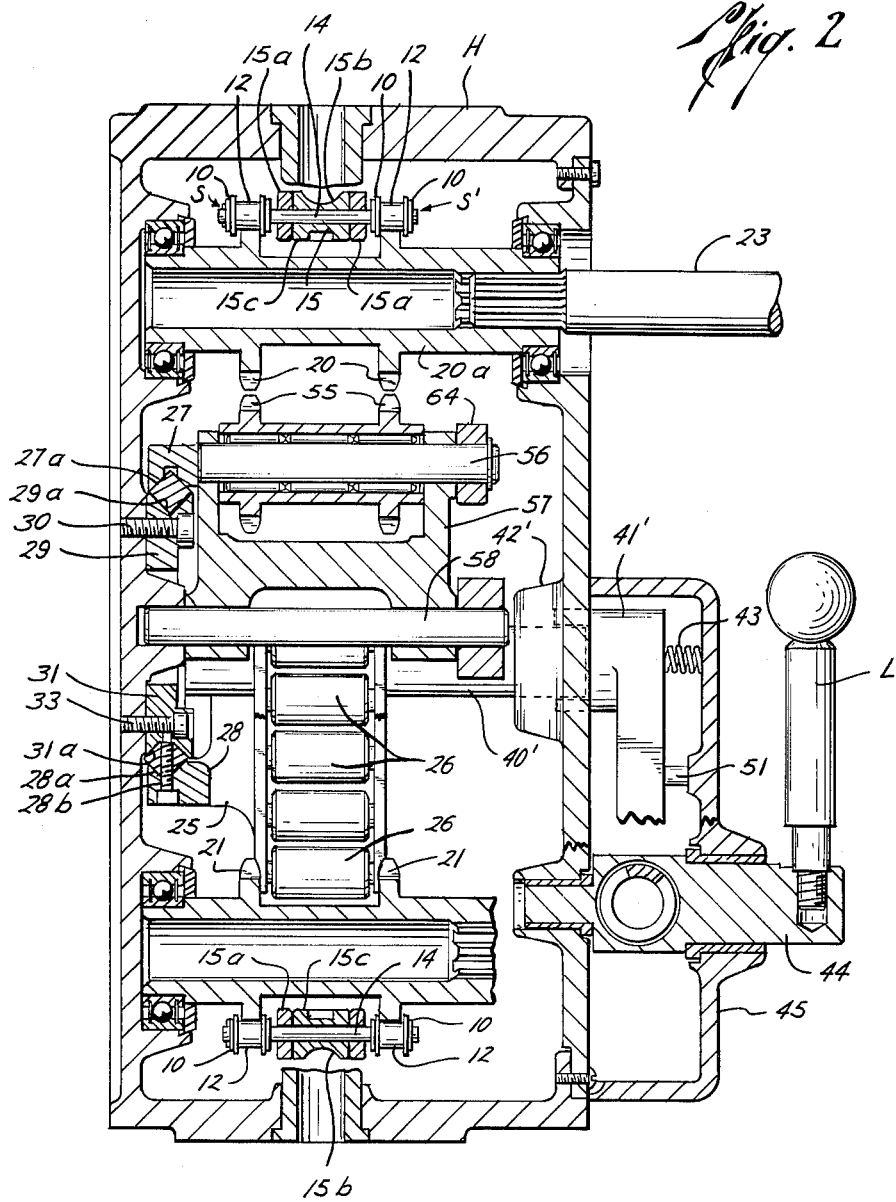
FIG. 2 is a vertical sectional view taken on line 2—2 of FIG. 1 and further illustrates the invention; and, FIG. 3 is a fragmentary isometric view to further illustrate the details of the present invention in the preferred embodiment.
Figure 3:
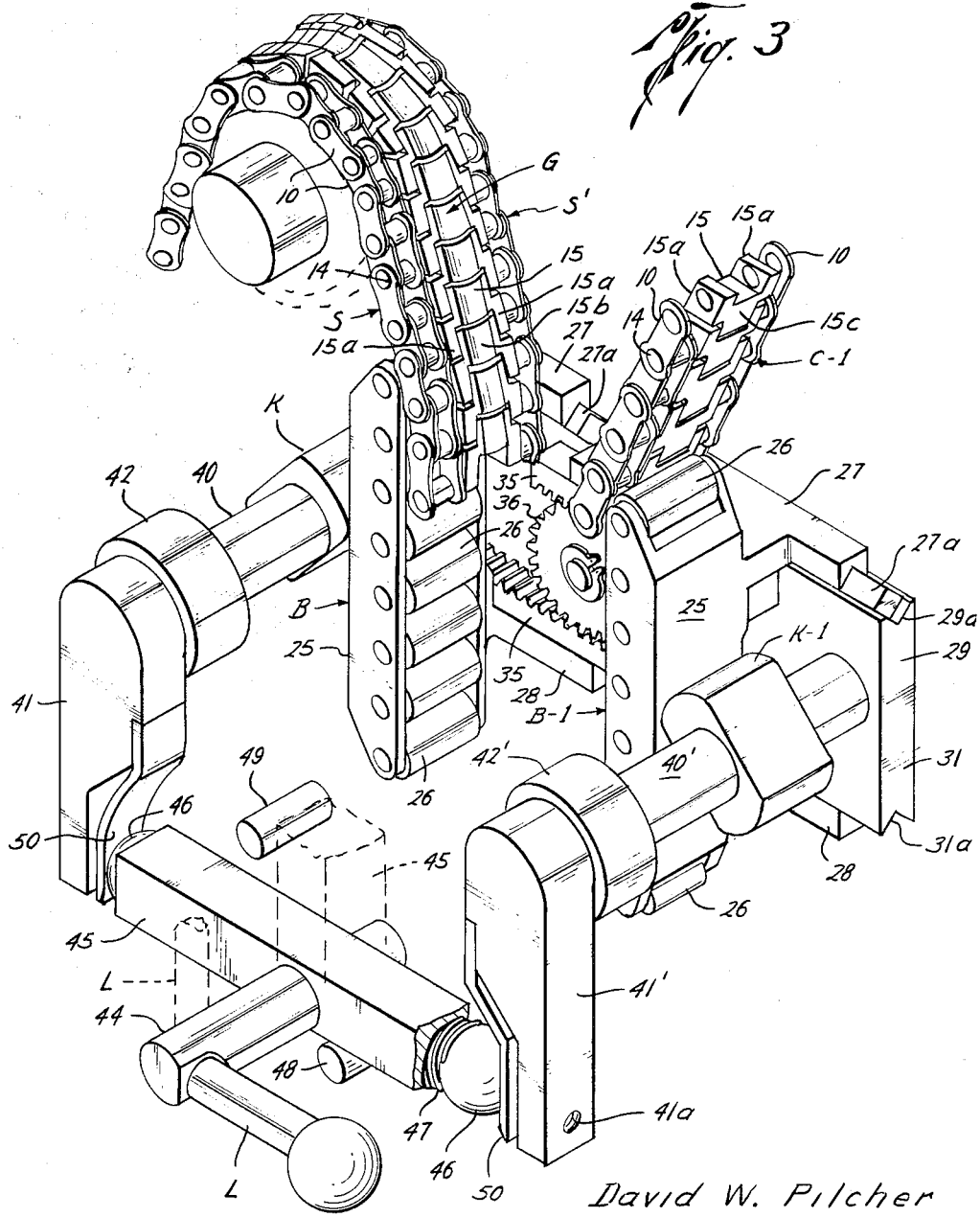

Considering the invention more in detail, the endless chain C may be formed in various ways, but as illustrated, such chain C includes two chain sections S and S' with a section of gripping elements G therebetween. Each of the chain sections S and S' is a conventional chain with connecting links 10 (FIGS. 1–3). Conventional rollers 12 are disposed between the links 10 in the usual manner and they are interconnected with spindles or connecting pins 14 which project from one set of chains S to the other set S' as best seen in FIG. 2. The spindles or pins 14 extend through the links 10 and also through the rollers 12 and gripping elements 15 of the gripping section G. It is to be noted that in the preferred form of the invention the gripping elements are each formed with a yoke having yoke arms 15a through which pin 14 extends. Each gripping element 15 preferably has an inner recessed gripping surface 15b which is adapted to engage the tubing or cable being gripped, moved or snubbed. The back surfaces 15c (FIGS. 2 and 3) of the gripping elements 15 are flat and form a substantially continuous surface for engagement by the back-up assemblies B and B-1, as will be more evident hereinafter.

The chain assembly C-1 is formed in the same manner as the chain assembly C except that it is disposed with the gripping elements 15 facing in the opposite direction to those gripping elements 15 of the chain C. In that manner, the inward recessed surfaces 15b of the assemblies C and C-1 are facing each other as they pass through the longitudinal reach portions forming the longitudinal passage P. In that manner, the gripping elements 15 fit around the curved external surface of the tubing, cable or other similar elongate object being gripped and/or fed with the apparatus.

Each of the endless chains C and C-1 is mounted upon an upper sprocket 20 and a lower sprocket 21. As best seen in FIG. 2, each of the upper sprockets 20 is in fact a double sprocket mounted on a spindle shaft 20a which is splined to a drive shaft 23, suitably connected to any source of power such as an electric motor (not shown). Each of the double sprockets 20 engages the respective chain sections S and S' so that when the shaft 23 is driven, the chains C and C-1 are rotated in opposite directions. The sprockets 21 at the lower ends of the chain assemblies C and C-1 are also double sprockets which likewise engage the chain sections S and S' of each of the chains C and C-1, and normally such lower sprockets 21 are not driven except by the movement of the chains C and C-1.

Each of the back-up assemblies B and B-1 includes a support frame 25 with a plurality of rollers 26 longitudinally mounted thereon for engagement with the back surfaces 15c of the chains C and C-1, respectively. Each of the support frames 25 has a guide arm 27 extending laterally therefrom at its upper end and another laterally extending guide arm 28 extending therefrom at its lower end.

The guide element 27 has a square cross-sectional slide bar 27a which is preferably secured to the arm 27 for movement therewith. The bar 27a is disposed diagonally so as to provide a V-shaped lower surface which fits within a guide way surface 29a of the guide way element 29. The guide way element 29 is preferably secured to the main housing H by means of one or more bolts 30 (FIG. 2). A similar arrangement is provided for the lower guide arm or element 28 which has a slide bar 28a secured thereto by a screw or bolt 28b for movement together. The slide bar 28a is also positioned diagonally so as to provide a V-shaped surface at its upper end which is inverted and which fits within a guide way surface 31a of a guide way support or element 31. The guide way element 31 is secured to the main housing H by bolts 33 or any other suitable securing means. Each of the frame supports 25 is thus moved inwardly and outwardly with respect to the other frame support 25 on its respective slides and guide ways, thus assuring that the back-up assemblies B and B-1 remain in a parallel arrangement to each other as they move backwardly and forwardly. It is to be noted that FIG. 3 is somewhat schematic in the illustration of the slides and guide ways since the guide ways 29 and 31 are both shown as a single element in FIG. 3 when in fact they are preferably formed separately and are affixed to the main housing H as shown in detail in FIG. 2.

Each of the support frames 25 is also provided with a gear rack 35, with the gear teeth 35a on the rack 35 for the back-up assembly B being disposed downwardly while the teeth 35b on the lower gear rack 35 of the back-up assembly B-1 are disposed upwardly. In that manner, both of the gear racks 35 are adapted to engage a single pinion gear 36 mounted on the main housing H. By reason of the engagement of both of the gear racks 35 with the single pinion gear 36, the back-up assemblies B and B-1 move inwardly and outwardly the same amounts so as to maintain the center line between them at a fixed line while varying the lateral distance therebetween. Since the back-up assemblies B and B-1 are initially positioned so that the center line between them is also coincidental with the center line of the longitudinal passage P, such gear and rack construction assures the maintaining of the center line of the passage P in a fixed position while varying the space between the longitudinal reaches of the endless chains C and C-1.

The cams K and K-1 are mounted on rotatable shafts 40 and 40', respectively for rotation therewith. Cam arms 41 and 41' are operably connected to the ends of the shafts 40 and 40', respectively so that movements of the arms 41 and 41' are transmitted to the cams K and K-1. Suitable bearings such as indicated a 42 and 42' are provided for the shafts 40 and 40', respectively, such bearings being shown schematically in FIG. 3 and more in detail in FIG. 2. As shown in FIG. 2, the shaft 40' extends through the bearing 42', and the cam arm 41' is splined, keyed or otherwise connected to the shaft 40' for movement therewith. A resilient spring 43 may be employed to constantly urge the arm 41' inwardly, and the same structure may also be used for the arm 41.

The position of the arms 41 and 41' is controlled by the lever L which is connected to a rotatable shaft 44 mounted in a cover or auxiliary portion of the housing 45. Such shaft 44 is secured to a rotatable or pivotable actuating arm 45 having a curved surface or ball detent 46 at each end. Normally, the ball detent 46 at the right-hand end (as viewed in FIG. 3) is urged outwardly by a resilient member such as the spring 47 so as to maintain the balls 46 resiliently in contact with the arms 41 and 41' when in the locked position of FIG. 3. A stop pin 48 is preferably provided to locate the control arm 45 in the locked position while a second stop pin 49 is preferably provided to limit the movement of the control arm 45 and stop it in the released position shown partially in dotted lines in FIG. 3.

Preferably, each of the arms 41 and 41' has a resilient leaf type spring 50 formed on its inner surface for engagement with the balls 46, each of such springs 50 being adjustable by means of a screw threaded into a threaded bore 41a and engageable with the inside surface of the spring element 50. The extent to which the elements 50 project outwardly from their cam arms 41 and 41' determines the maximum inward position of the cams K and K-1, so that by adjusting such elements 50 with the appropriate screws in position behind them, the extent of travel of the cams K and K-1 is adjustable. A pin stop 51 is also provided for the arm 41' as shown in FIG. 2 to limit its rotational movement and of course a similar pin stop may be provided for the other cam arm 41.

The resilient means R for exerting a resilient outward force on the outer loops of the chains C and C-1 serves to exert a force in opposition to the cams K and K-1, as will be more evident. Such resilient means R includes a pair of sprockets 55, each of which engages the outer loop of the respective chain assemblies C and C-1 (FIGS. 1 and 2). Each of the sprockets 55 is a double sprocket as can be seen in FIG. 2 for engagement with the chain sections S and S' in the same manner as the sprockets 20 and 21 engage such sections. The sprockets 55 are mounted on sprocket pins or axles 56 suitably disposed in a pivoted yoke 57 on a mounting shaft 58 supported in the main housing H.

The sprockets 55 are urged away from each other by means of a spring 60 disposed within a cylinder 61 and engageable with a piston element 62 mounted in the cylinder 61. The cylinder 61 is longitudinally slidable on the piston 62 and they are urged apart by the spring 60. A yoke or retaining ring 63 is connected to the piston 62 and is mounted on the shaft 56 for the sprocket 55 used in conjunction with the endless chain assembly C. Likewise, a yoke or ring 64 is connected to a threaded shank 65, which in turn is threaded into a threaded bore 61a of the cylinder 61. Such yoke 64 is mounted on the shaft 56 for the sprocket 55 used in conjunction with the endless chain C-1 (FIGS. 1 and 2). By loosening the nut 66 carried on the threaded shaft 65, the amount of pressure exerted by the spring 60 may be adjusted and then the nut 66 may be tightened into contact with the end of the cylinder 61 to lock the assembly in the selected position. Thus, by the adjustment of the single screw 65, the amount of force exerted in opposition to both cams K and K-1 is adjustable. By the engagement of, and the outward pushing force exerted by, the sprockets 55 on the outer loops of the endless chains C and C-1, the inner reaches or sections of the chains C and C-1 are pulled away from each other when the cams K and K-1 have been moved to their released position which is accomplished by moving the lever L to its dotted line position shown in FIG. 3.

To facilitate the guiding of a tubing, cable or other elongate object through the longitudinal passage P, the main housing H is provided with an upper tubular guide tube 70 and a lower tubular guide tube 71. The upper tubular guide tube 70 is formed with a piar of pointed and arcuate tips or projections 70a which are diametrically positioned and extend downwardly into the converging portions of the endless chains C and C-1 (FIG. 1) to prevent any movement of a cable out of longitudinal alignment as it moves upwardly between the chains C and C-1. The lower guide tube 71 also has similar tips or projections 71a which extend upwardly so as to prevent the cable or other flexible elongate element from being forced inadvertently out of longitudinal alignment as the cable or other flexible elongate element moves downwardly between the chains C and C-1.

It should be noted that the main housing H is illustrated with flange plates 72 and 73 having suitable bolt holes therein for mounting the main housing in a desired location to any suitable support. The lower surface 74 of the main housing H may be positioned on the top of a well assembly or any other body into which the elongate object is to be moved or from which such elongate object is to be moved. The sides of the housing H are shown with access openings 75 which are normally covered with suitable cover plates in operation to protect the apparatus from foreign objects.

In use, the apparatus of this invention is positioned for the feeding of a tubing, cable or other elongate object through the longitudinal passage P. The chains C and C–1 grip such object and either apply a pushing force downwardly, a pulling force upwardly, or a braking action to prevent movement in either an upward or downward direction.

For moving the inner longitudinal reach portions of the endless chains C and C–1 to the gripping position, the back-up assemblies B and B–1 are in contact with the back surfaces of the endless chains C and C–1 as shown in FIG. 1 and the cams K and K–1 are rotated to the position of FIG. 1 by the movement of the lever L to its solid line position as shown in FIG. 3. The cams K and K–1 are thus locked in their gripping position so that upon a rotation of the driven sprockets 20, the elongate object in the passage P and extending through the tubes 70 and 71 is moved longitudinally. It is to be noted that spring 60 acts to maintain the chains C and C–1 taut while in the gripping position.

When it is desired to release the chains C and C–1 from the gripping position, the lever L is simply rotated to the dotted line position of FIG. 3, which is approximately 90°, so as to move the ball elements 46 out of contact with the leaf members or springs 50 of the control cam arms 41 and 41'. When the lever L is in such released position, the cams 41 and 41' are free to move inwardly from the position shown in FIG. 3 and thus the cams K and K–1 are free to rotate away from the back-up assemblies B and B–1. The resilient means R is constantly acting to urge the outer loops of the chains C and C–1 outwardly, so that when the cams K and K–1 are released, the resilient action of the spring 60 urges the cams to rotate by a force exerted on the inner reaches or loop portions of the chains C and C–1. In that manner, the chains C and C–1 remain taut, but the inner portions or reaches of the chains C and C–1 are spread apart to an open position for the initial insertion of an elongate object or for release.

It is to be noted that as the inner portions or reaches of the chains C and C–1 move outwardly or away from each other, the back-up assemblies B and B–1 also move outwardly or away from each other, and during such movement, they are guided so as to remain parallel to each other at all times by means of the gear and pinion construction heretofore described. Thus, the center line of the longitudinal passage B is maintained in a fixed position at all times even though the distance between the inner reaches or loop portions of the chains C and C–1 varies in the released and gripping positions.

Although this apparatus has been described above and is claimed hereinafter as an endless chain apparatus, it will be understood by those skilled in the art that endless belts may be substituted for the endless chains C and C–1 as equivalent structure. When endless belts are used, the sprockets 20 and 21 normally are replaced by pulleys of any conventional type capable of driving the belts by frictional engagement between the belts and the pulleys.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An endless chain apparatus for gripping an elongate object, comprising:
   (a) a pair of endless chains,
   (b) means for mounting said chains with a longitudinal reach of each chain in opposed relationship to the other to form a longitudinal passage for receiving an elongate object,
   (c) a back-up assembly for each endless chain disposed in back of the longitudinal reach of each chain,
   (d) guide means for each back-up assembly for permitting lateral movement of said back-up assemblies while preventing longitudinal movement thereof,
   (e) cam means operably engageable with each back-up assembly for moving the back-up assemblies and the longitudinal reaches engaged thereby towards each other in a lateral direction only, and
   (f) means acting in opposition to said cam means for urging the longitudinal reaches apart.

2. An endless chain apparatus for gripping an elongate object, comprising:
   (a) a pair of endless chains,
   (b) means for mounting said chains with a longitudinal reach of each chain in opposed relationship to the other to form a longitudinal passage for receiving an elongate object,
   (c) a back-up assembly for each endless chain disposed in back of the longitudinal reach of each chain,
   (d) guide means for each back-up assembly for permitting lateral movement of said back-up assemblies while preventing longitudinal movement thereof,
   (e) cam means operably engageable with each back-up assembly for moving the back-up assemblies and the longitudinal reaches engaged thereby towards each other,
   (f) lock means for locking said cam means in their inward position for gripping the elongate object with the reaches of the chain, and
   (g) resilient means acting in opposition to said cam means for constantly applying a force to urge the longitudinal reaches apart when the lock means is released.

3. An endless chain apparatus for gripping an elongate object, comprising:
   (a) a pair of endless chains,
   (b) means for mounting said chains with a longitudinal reach of each chain in opposed relationship to the other to form a longitudinal passage for receiving an elongate object,
   (c) a back-up assembly for each endless chain disposed in back of the longitudinal reach of each chain,
   (d) cam means for each back-up assembly for moving the back-up assemblies and the longitudinal reaches engaged thereby towards each other,
   (e) lock means for locking said cam means in their inward position for gripping the elongate object with the reaches of the chain,
   (f) means acting in opposition to said cam means for urging the longitudinal reaches apart when the lock means is released, and
   (g) means for moving each of said back-up assemblies in equal amounts as they move towards and away from each other to maintain a fixed center line between the longitudinal reaches while adjusting the lateral space therebetween, and
   (h) means for maintaining said reaches parallel to each other as they are moved towards and away from each other and during the gripping of an elongate object between said reaches.

4. An endless chain apparatus for gripping an elongate object, comprising:
   (a) a pair of endless chains,
   (b) means for mounting said chains with a longitudinal reach of each chain in opposed relationship to the other to form a longitudinal passage for receiving an elongate object,
   (c) a back-up assembly for each endless chain disposed in back of the longitudinal reach of each chain, (d) cam means for each back-up assembly for moving the back-up assemblies and the longitudinal reaches engaged thereby towards each other,
(e) lock means for locking said cam means in their inward position for gripping the elongate object with the reaches of the chain,
(f) means acting in opposition to said cam means for urging the longitudinal reaches apart when the lock means is released,
(g) means for moving each of said back-up assemblies in equal amounts as they move towards and away from each other to maintain a fixed center line between the longitudinal reaches while adjusting the lateral space therebetween, and
(h) said last-named means including:
   (1) a gear rack connected to each back-up assembly, and
   (2) a pinion gear engaged with both of the racks.

5. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain,
(d) guide means for each back-up assembly for permitting lateral movement of said back-up assemblies while preventing longitudinal movement thereof,
(e) cam means for each back-up assembly for moving the back-up assemblies and the longitudinal reaches engaged thereby towards each other in a lateral direction only,
(f) lock means for locking said cam means in their inward position for gripping the elongate object with the reaches of the chain,
(g) means acting in opposition to said cam means for urging the longitudinal reaches apart when the lock means is released,
(h) means for moving each of said back-up assemblies in equal amounts as they move towards and away from each other to maintain a fixed center line between the longitudinal reaches while adjusting the lateral space therebetween,
(i) each of said back-up assemblies including:
   (1) a support frame, and
   (2) a plurality of rollers mounted on said support frame and engageable with the back of the longitudinal reach of the chain, and
(j) means for maintaining said reaches parallel to each other as they are moved towards and away from each other and during the gripping of an elongate object between said reaches.

6. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain,
(d) cam means for each back-up assembly for moving the back-up assemblies and the longitudinal reaches engaged thereby towards each other,
(e) lock means for locking said cam means in their inward position for gripping the elongate object with the reaches of the chain,
(f) means acting in opposition to said cam means for urging the longitudinal reaches apart when the lock means is released,
(g) each of said back-up assemblies including:
   (1) a support frame,
   (2) a plurality of rollers mounted on said support frame and engageable with the back of the longitudinal reach of the chain,
(h) a gear rack connected to each support frame, and
(i) a pinion gear engageable with both of said racks for obtaining the same amount of movement of each of said back-up assemblies as they are moved back and forth to thereby maintain the same center line through the longitudinal passage while varying the lateral width of such longitudinal passage.

7. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain,
(d) cam means for each back-up assembly for moving the back-up assemblies and the longitudinal reaches engaged thereby towards each other, and
(e) resilient means exerting a constant force on the outer loop of each endless chain for constantly pulling the inner longitudinal reaches of the chains away from each other to the extent permitted by the position of the cam means.

8. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain,
(d) cam means for each back-up assembly for moving the back-up assemblies and the longitudinal reaches engaged thereby towards each other,
(e) means acting in opposition to said cam means for urging the longitudinal reaches apart,
(f) each of said cam means having a control arm connected thereto, and
(g) a releasable locking lever adapted to engage both of the control arms for holding the cam means in the gripping position.

9. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain,
(d) cam means for each back-up assembly for moving the back-up assemblies and the longitudinal reaches engaged thereby towards each other,
(e) means acting in opposition to said cam means for urging the longitudinal reaches apart,
(f) each of said cam means having a control arm connected thereto,
(g) a releasable locking lever adapted to engage both of the control arms for holding the cam means in the gripping position, and
(h) means for pivotally mounting said locking lever for movement to a released position to permit rotation of the cam means.

10. An endless chain apparatus for gripping an elongate object, comprising:
(a) a pair of endless chains,
(b) means for mounting said chains with a longitudinal reach of each chain in opposed relationship to the other to form a longitudinal passage for receiving an elongate object,
(c) a back-up assembly for each endless chain disposed in back of the longitudinal reach of each chain, (d) cam means for each back-up assembly for moving the back-up assemblies and the longitudinal reaches engaged thereby towards each other, (e) resilient means exerting a constant force on the outer loop of each endless chain for constantly pulling the inner longitudinal reaches of the chains away from each other to the extent permitted by the position of the cam means, and (f) a single adjustable means for adjusting the resilient force exerted by said resilient means, whereby a single adjustment varies the force opposing both of the cams.

References Cited by the Examiner

UNITED STATES PATENTS

| | | | |
|---|---|---|---|
| 2,679,924 | 6/1954 | Powell | 198—165 |
| 2,910,205 | 10/1959 | Kretschmer | 198—165 |

FOREIGN PATENTS 352,016  4/1961  Switzerland.

EVON C. BLUNK, *Primary Examiner.*

RICHARD E. AEGERTER, *Examiner.*